United States Patent [19]

Gorman

[11] Patent Number: 4,734,572

[45] Date of Patent: Mar. 29, 1988

[54] DUAL LIGHT SOURCE LOCATING AND TRACKING SYSTEM

[75] Inventor: Robert R. Gorman, Newtown, Conn.

[73] Assignee: Unimation Inc., Danbury, Conn.

[21] Appl. No.: 829,738

[22] Filed: Feb. 14, 1986

[51] Int. Cl.$^4$ .............................................. G05B 1/00
[52] U.S. Cl. ..................................... 250/202; 318/577
[58] Field of Search .................... 250/202, 222.1, 221; 356/1, 4; 318/577; 901/47

[56] References Cited

U.S. PATENT DOCUMENTS

| 4,413,910 | 11/1983 | Cornu et al. | 250/202 |
| 4,417,127 | 11/1983 | Nachev et al. | 250/202 |
| 4,567,347 | 11/1986 | Ito et al. | 250/202 |
| 4,629,878 | 12/1986 | Blanc et al. | 250/202 |

Primary Examiner—David C. Nelms
Assistant Examiner—Jessica L. Ruoff
Attorney, Agent, or Firm—M. P. Lynch

[57] ABSTRACT

Dual light beams directed onto adjacent surface elements defining a seam therebetween produce reflected light images which contact an electro-optic linear array sensor which in turn generates light spot position information for determining seam location via triangulation calculations.

7 Claims, 4 Drawing Figures

DUAL LIGHT SOURCE LOCATING AND TRACKING SYSTEM

BACKGROUND OF THE INVENTION

The use of adhesives and sealants in the automotive industry is becoming increasingly important. Adhesives and sealants are used in the assemblies of such hem-flanged parts as doors, decks, beds and hoods. For example, sealing materials can be used in conjuction with more conventional spot-welding techniques. The sealant is first applied and then the sheet metal is welded through the sealant. Such a combined approach has allowed the distance between spot welds to be increased while reducing the number of welds. Some manufacturers, moreover, have eliminated the welding altogether by employing structural adhesives.

The application of sealant material to the seam or intersection of surfaces in an assembly line operation is presently a manual task requiring operator adjustment to vehicle position and seam location. The manual application of adhesives and sealants to assemblies has been found to be generally impractical because of the high throughput and high accuracy required. The present automotive manufacturing environment places exacting demands on systems that can automatically apply adhesives and sealants. Adhesives and sealants must be applied accurately, along the right bead path, in the required cycle time, in the precise volume required, and with the proper cross section. Otherwise, incorrect bonding or squeezing or bead placement will occur.

While numerous automation techniques have been employed in various assembly line operations, the randomness of the position of a vehicle on the assembly line, coupled with the imprecise tolerances of vehicle surfaces defining a seam have discouraged economical automation of the process of applying sealant to such seams.

Commercially available seam tracking systems employing two dimensional sensing arrays and extensive data computing capability have proven to be too costly and complex for automating the sealant dispensing process.

It is therefore an object of this invention to provide a simple, inexpensive two-dimensional seam locating and tracking appartus which will reliably locate and track a seam.

SUMMARY OF THE INVENTION

There is disclosed herein with reference to accompanying drawing a simple, relatively inexpensive seam locating and tracking technique employing dual light beams and a solid state sensor including a line array for detecting the reflection of the dual light beams from surfaces of the vehicle to position the end effector of a manipulator apparatus relative to a seam defined by the vehicle surfaces on the basis of range finder triangulation calculations.

The dual light beams directed onto vehicle surfaces defining a seam therebetween may be developed by dual light sources such as lasers, or a single light source interfacing a fiber optic configuration including dual light pipes for directing the output of the single light source as dual light beams onto the vehicle surfaces defining the seam. Optics associated with a solid state sensor, and corresponding to two triangulation range finders, direct the reflected light spot image from the surfaces onto a line array sensor which in turn transmits light spot data to a data processor for triangulation computations.

In an automation application, the combination of the dual light beam sources and the solid state sensor are secured to a mounting fixture attached to the end effector of a manipulator apparatus, or robot. In a typical automation application, a sealant dispensing apparatus is likewise secured to the mounting fixture and its positioned relative to the seam by the manipulator apparatus in response to position control information derived from the calculations performed by the data processor. The seam locating and tracking technique employed is based on the concept of ranging on two separate surfaces simultaneously and deriving two dimensional information from an electro-optic linear array sensor which is in essence a one dimensional sensor.

BRIEF DESCRIPTION OF THE DRAWINGS

The invention will become readily apparent from the following exemplary description in connection with the accompanying drawings:

FIG. 4 is an alternate embodiment to that of FIG. 2 wherein the dual light source arrangement of FIG. 2 is replaced with a single light source in combination with a dual light pipe fiber optic configuration.

DESCRIPTION OF THE PREFERRED EMBODIMENT

Figure 1:
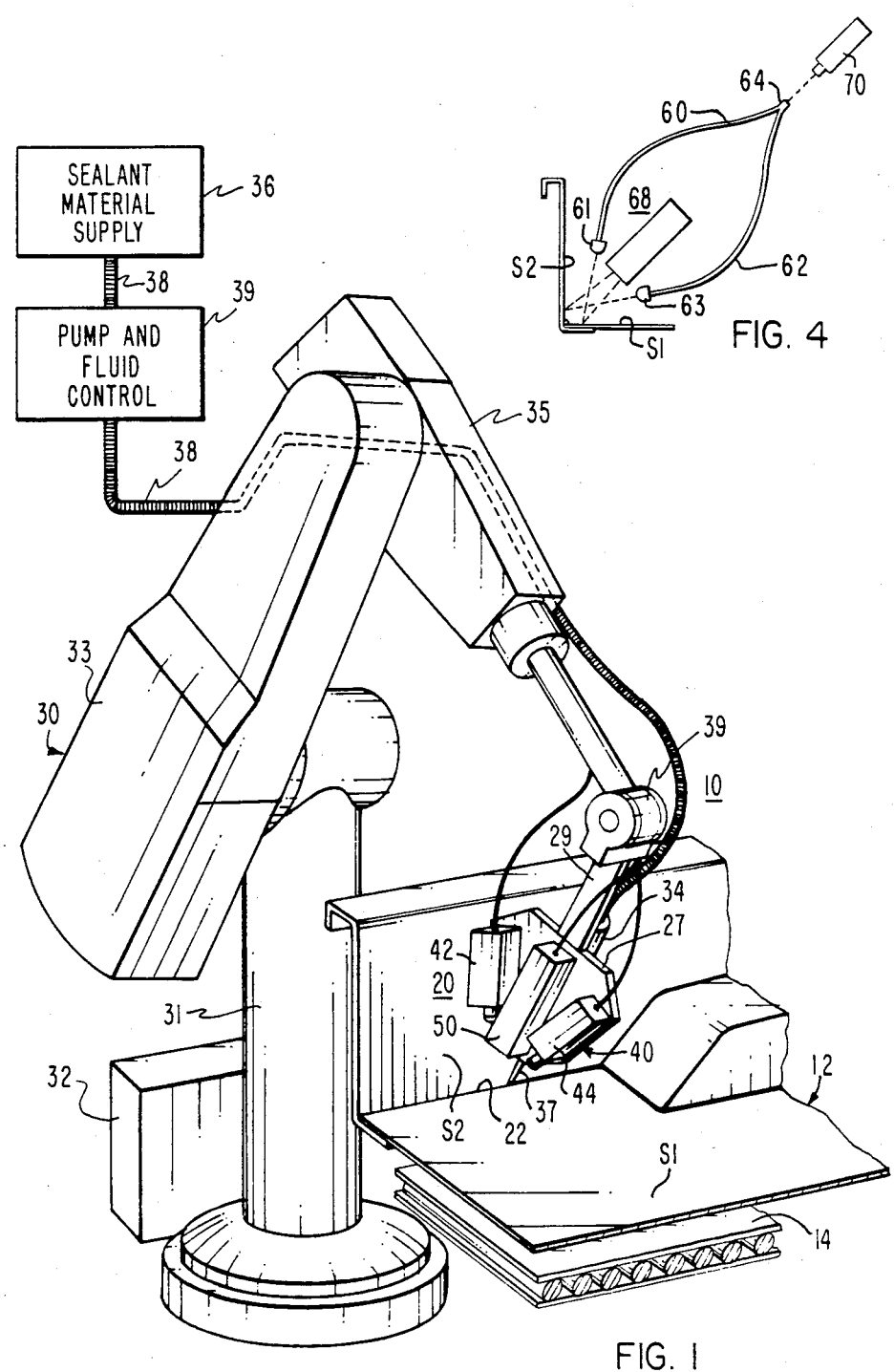
FIG. 1 is a schematic illustration of the seam locating and tracking system in combination with a sealant dispenser positioned relative to adjacent surfaces of a truck bed by a robot.

Referring to FIG. 1 there is schematically illustrated a sealant dispensing system 10 positioned relative to a vehicle deck 12 positioned on a conveyor 14 of a vehicle assembly line. A sealant application and sensing apparatus 20 is secured to a mounting plate 27 supported by the end effector 29 of the manipulator apparatus, or robot, 30. The sealant application and sensing apparatus 20, which includes a sealant dispenser 34 and a seam locating and tracking system 40, is moved relative to a vehicle seam 22, defined by adjacent surfaces S1 and S2 of the vehicle deck 12, by the robot 30. A material supply means such as container 36 holds the sealant material to be dispersed by the sealant dispenser 34 through the nozzle 37. The material supply means 36 is in communication with the nozzle 37 via a conduit 38. A pump and fluid flow control apparatus 39 insures that the appropriate flow of sealant material is maintained to the nozzle 37.

Figure 2:
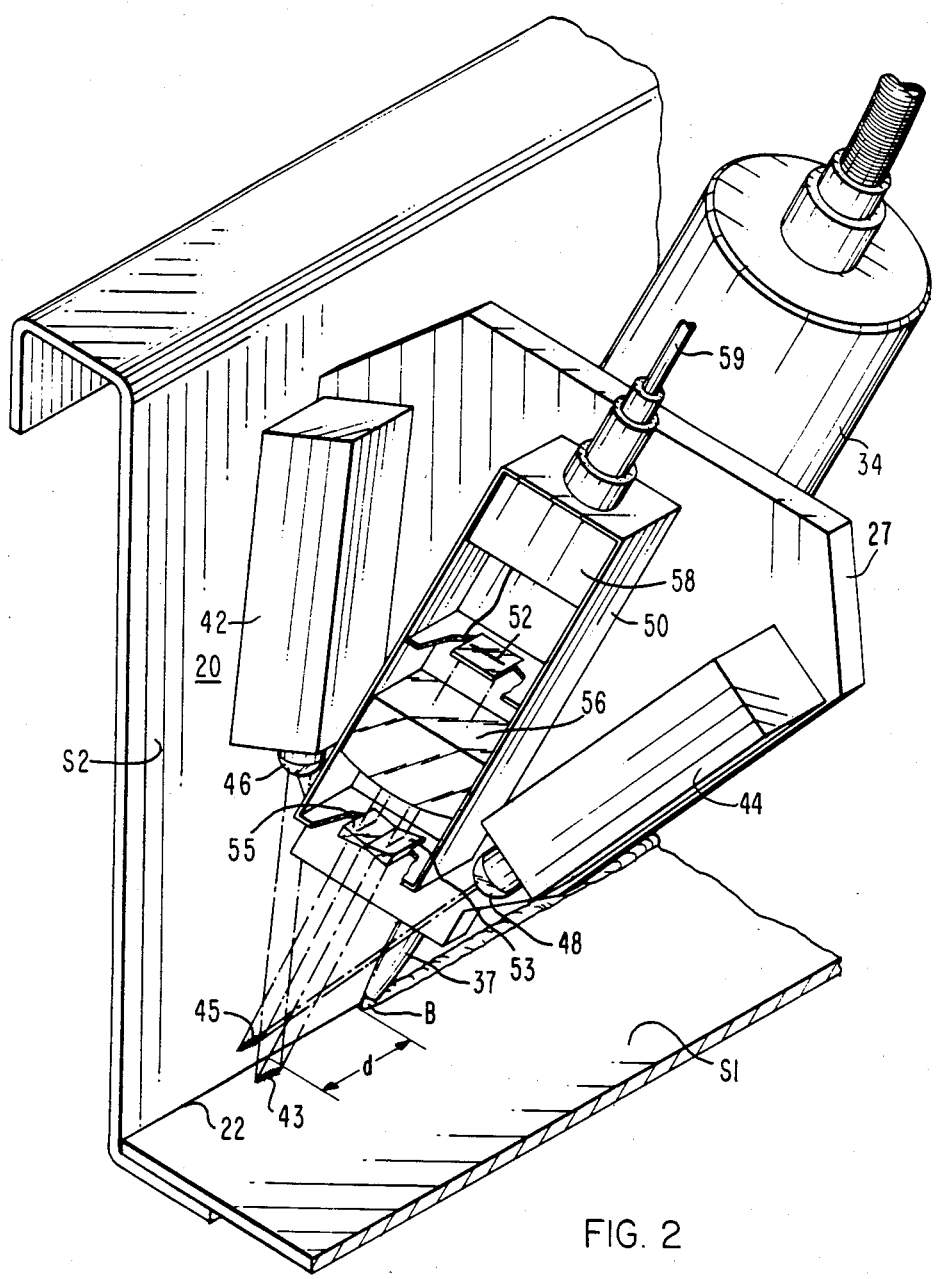
FIG. 2 is a sectioned schematic illustration of the dual light source-solid state sensor implementation of the invention of FIG. 1 as secured to a robot end effector mounting plate supporting a sealant dispensing unit.

The seam locating and tracking system 40 includes light source 42 and 44 and a solid state sensor 50. The seam location information derived by the solid state sensor 50 responding to images corresponding to reflected light beams from the surfaces S1 and S2 is processed by a microprocessor within the sensor 50, as illustrated in FIG. 2. This information is transmitted as raw data to the robot controller 32 which in turn calculates the seam position and controls the positioning of the nozzle 37 relative to the seam 22 through the position control of the robot 30. The robot 30 typically includes a base portion 31, at least a first arm 33 rotatably and pivotably mounted with respect to the base 31, and preferably a second arm 35 rotatably mounted around one end of the arm 33 with a wrist 39 mounted onto the cantilevered end of the arm 35. The mounting plate 27 supported by the end effector 29 is attached to the wrist 39 for manipulation by the robot 30.

The seam tracking system 40, as illustrated in FIG. 2, moves in advance of the sealant dispensing nozzle 37 by a distance d, which may typically be approximately three inches, to locate the seam 22 and provide position control information to the robot controller 32 to maintain the sealant bead B at the seam 22. The solid state sensor 50 employs a linear array sensor 52 comprised of a series of photosensing elements, or photoreceptors, for detecting the position of reflected images from surfaces S1 and S2 in response to impinging light beams from light sources 42 and 44, respectively. Inasmuch as the linear array sensor 52 is a single line array, as compared with conventional two-dimensional solid state detector arrays, the light beam images projected onto the surfaces S1 and S2 by the light sources 42 and 44 are represented by an elliptical, or elongated, light spot images 43 and 45. The longitudinal axis of the elongated light spots 43 and 45 are parallel to the seam 22 and are projected onto the detector 52 such that the longitudinal axis of the reflected image is perpendicular to the line array of the sensor 52. The elongated image permits the use of the inexpensive line array detector while allowing for slight misalignment without concern of loss of detection of the reflected image.

The light sources 42 and 44 are typically illustrated as being laser light sources generating a collimated light beam and employing cylindrical lens elements 46 and 48, respectively, to transform the collimated light beam into an elongated light beams resulting in the projection of the elongated light spots 43 and 45 on the truck bed surfaces S1 and S2 defining the seam 22. A suitable, commercially available, laser for implementing this operation is a Class 2, helium-neon laser available from Uniphase Company. While laser wavelength is not a critical concern, laser light in the visible region is preferred to assure operator awareness of the presence of laser light energy and to provide for visual observation of the light image patterns relative to the seam 22.

The optics associated with the solid state sensor 50 include image viewing prisms 53 and 55 wherein prism 53 views the elongated image projected onto surface S1 by light source 42 while prism 55 views the elongated image projected onto surface S2 by light source 44. Each prism produces a localized optical field which is centered on the expected location of the elongated light image on the corresponding truck bed surface. The utility of the viewing prisms 53 and 55 to view the reflected elongated images of the surfaces S1 and S2 and collect the reflected light therefrom permits the use of a high magnification lens 56 to transmit the elongated light images onto the linear array sensor 52 in a perpendicular orientation with the linear sensor array of the detector 52. The microprocessor 58 packaged within the sensor 50 indentifies the position of intersection of the elongated light images with the linear array sensor 52 and transmits this information via cable 59 to the robot controller 32. The robot controller 32 processes the image position information and generates control signals to the robot 30 to maintain a prescribed position of the sealant nozzle 37 with respect to the seam 22. The range triangulation calculations performed by the robot controller 32 in response to the image information from the solid state sensor 50 compute the distances between the camera and the intersecting surfaces S1 and S2. These calculations correspond to range finding techniques using triangulation calculations.

Figure 3:
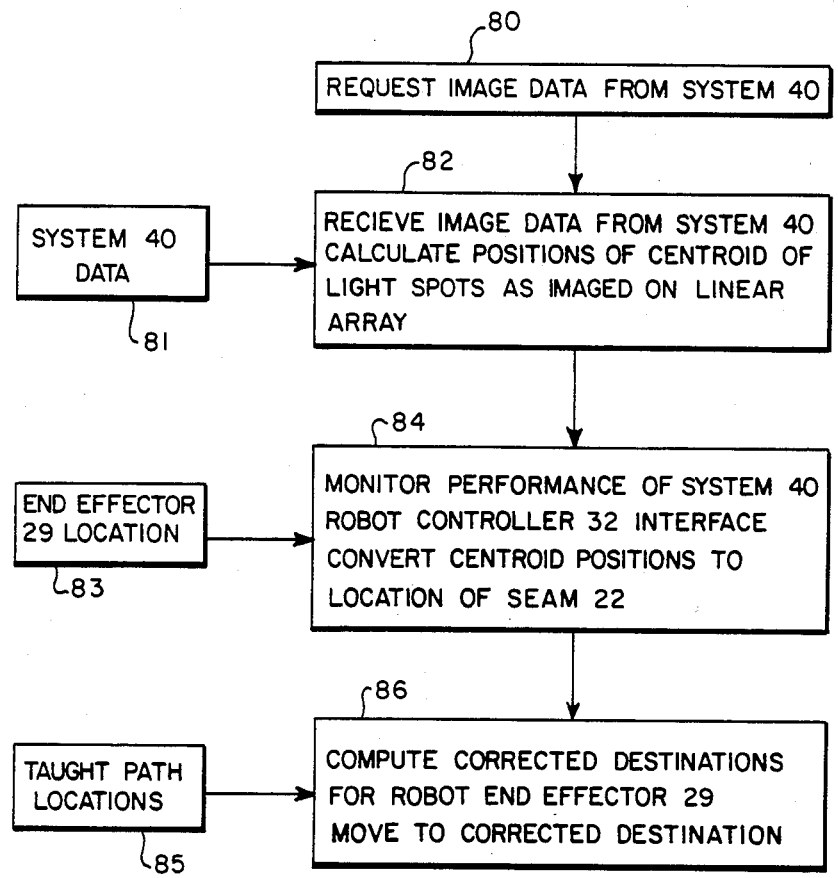
FIG. 3 is a functional diagram of a software program typically used by the robot controller of FIG. 2 to process the information of the seam locating and tracking system.

The range finding calculations and the control of the end effector 29 by the robot controller 32 in response to the data provided by the seam locating and tracking system 40 is performed by a software program which functions in accordance with the process steps 80–86 illustrated in FIG. 3.

The linear array comprising sensor 52 is typically implemented through the use of a commercial line array such as that embodied in the Minneapolis Honeywell Solid State Sensor Type HDS23 wherein the line array consists of two interleaved sets of 23 photoreceptors each. In the disclosed embodiment, one set responds to the light image viewed by prism 53 while the second set responds to the light image collected and transmitted by prism 55. The independent image profile developed by each photoreceptor set is separately provided by the microprocessor 58 to the robot controller 32 for processing.

The concept described above enables the sensing apparatus 20 to range onto separate surfaces, S1 and S2, simultaneously and to derive two-dimensional information from a linear array, sensor 52, which is essentially a one-dimensional sensor.

The dual light beam requirement of the sensor apparatus 20 may be alternatively implemented through the use of a single light source and a dual light pipe configuration as illustrated in FIG. 4. Dual fiber optic light pipes 60 and 62 extending from a fiber optic coupler 64 to cylindrical lens element 61 and 63 associated with the sensing apparatus 68 direct elongated light images onto the surfaces S1 and S2 in response to a light beam transmitted from the light source 70 to the fiber optic coupler 64. This embodiment permits the location of the light source 70 remote from the assembly line working environment thereby reducing the weight and complexity of the sealant application and sensing apparatus 20.

What is claimed is:
1. In an automation system, the combination of,
   a manipulator apparatus having an end effector means and a control means for positioning said end effector means,
   a seam locating and tracking means coupled to said end effector means for transmitting information to said control means to locate the position of a seam defined by first and second surface elements,
   said seam locating and tracking means including,
   a light source means for simultaneously directing first and second elongated light spots onto said first and second surface elements respectively on either side of said seam,
   a light sensing means including a one dimensional linear array sensor means and optical means for simultaneously directing the reflected images of said elongated light spots from said surfaces onto said linear array sensor means such that the longitudinal axes of the reflected images are essentially perpendicular to said one dimensional linear array sensor means, and
   processing means for transmitting informtion indicating the simultaneous position of said reflected im- ages on said one dimensional linear array sensor means to said control means, said control means responding to said information by determining the location of the seam on the basis of ranging on said first and second surface elements simultaneously and deriving essentially two dimensional information from said one dimensional linear array sensor.

2. In an automation system as claimed in claim 1 further including a sealant dispensing means coupled to said end effector means in combination with said seam locating and tracking means for positioning relative to said seam in response to said control means, said control means causing said sealant dispensing means to be moved relative to said seam in response to information developed by said seam locating and tracking means.

3. In an automation system as claimed in claim 1 further including a first and second cylindrical lens means optically coupled to said light source means to project said elongated first and second light spots on said first and second surface elements, the longitudinal axes of the reflected light spots being essentially parallel to the seam.

4. In an automation system as claimed in claim 1 wherein said optical means includes a first and second image viewing prism for viewing said first and second light spot images appearing on said first and second surface elements respectively, each prism producing a localized optical field which is centered on the expected location of the light spot image of the corresponding surface element and functioning to collect the reflected light therefrom.

5. In an automation system as claimed in claim 4 further including a magnification lens means optically coupled to said first and second image viewing prisms to transmit the light spot images developed by said first and second image viewing prisms onto said linear array sensor means.

6. In an automation system as claimed in claim 1 wherein said light source means comprises a single light source and an optical fiber means optically coupled to said single light source means for receiving the output of said single light source means as an input and producing a first and second light beam output for directing said first and second elongated light spots onto said first and second surface elements.

7. Apparatus for locating and tracking a seam defined by first and second surface elements comprising, a light source means for simultaneously directing first and second elongated light spots onto said first and second surface elements respectively on either side of said seam, a light sensing means including a one dimensional linear array sensor means and optical means for simultaneously directing the reflected images of said elongated light spots from said surfaces onto said linear array sensor means such that the longitudinal axes of the reflected images are essentially perpendicular to said one dimensional linear array sensor means, and processing means for transmitting information indicating the simultaneous position of said reflected images on said one dimensional linear array sensor means to said control means, said control means responding to said information by determining the location of the seam on the basis of ranging on said first and second surface elements simultaneously and deriving essentially two dimensional information from said one dimensional linear array sensor.

* * * * *